Patented Jan. 9, 1951

2,537,713

UNITED STATES PATENT OFFICE 2,537,713

THERMOSTABLE POLYMERIC VINYLIDENE CHLORIDE COMPOSITION

Arthur R. Sexton, Midland, Mich., assignor to The Dow Chemical Company, Midland, Mich., a corporation of Delaware No Drawing. Application May 20, 1949,
Serial No. 94,507

2 Claims. (Cl. 260—31.2)

The invention relates to compositions of matter containing polymeric vinylidene chloride products and stabilizing plasticizers to protect the polymeric products from thermal decomposition.

The polymer of vinylidene chloride and many of its copolymers have been described in patents and in other literature during recent years. Such polymeric bodies, and compositions containing them, are herein-referred to as polymeric vinylidene chloride products. It has been found that such products tend to darken after prolonged exposure to elevated temperatures. This darkening is accompanied by a change in other physical properties of the polymeric product and is assumed to be an evidence of partial decomposition. Because of the many desirable properties of polymeric vinylidene chloride products, a means is sought to overcome or prevent the tendency for such products to decompose on heating. Most plasticizers have little, if any, heat stabilizing effect on polymeric vinylidene chloride products. Typical also is the fact that some of the better plasticizers have undesirable odors that they impart to polymeric vinylidene chloride products.

It is, accordingly, among the objects of the present invention to provide a composition of matter comprising a polymeric vinylidene chloride product stabilized against the decompositional effects of heat. A related object is to provide a heat stabilizing plasticizer for polymeric vinylidene chloride products.

It has now been found that the related objects may be attained through the incorporation in polymeric vinylidene chloride products of amounts, generally in the range of from about 5 to about 12 per cent by weight, of α-methylbenzylbenzoate.

This ester has been found useful in stabilizing and plasticizing polymeric vinylidene chloride products for fabrication into films, filaments, and other articles by hot extrusion or molding operations. It is also useful in preparing practically odorless thermostable plastic articles. The α-methylbenzylbenzoate may serve both as a stabilizer and as a plasticizer for the polymeric vinylidene chloride products. It should be pointed out that the amount of this ester retained in the polymer product after fabrication will vary with the particular polymer and the treatment to which it is subjected. Thus, the non-crystalline copolymers (generally less than 75–80 per cent of vinylidene chloride) may retain up to 12 per cent or more of the ester, while the crystalline copolymers, especially in extruded and oriented forms, such as film or filaments, usually retain about 7 to 10 per cent of the ester.

By way of example, a crystalline copolymer of about 85 per cent vinylidene chloride and about 15 per cent vinyl chloride was mixed with 8 per cent by weight of α-methylbenzylbenzoate on a cold mill. A standard weight of the plasticized product and of the unmodified copolymer were each heated separately at 180° C. and the elapsed time (in minutes) was noted before a rapid evolution of hydrogen chloride gas occurred in each case. For convenience, this elapsed time is referred to as the "T-value." A high T-value indicates a thermally stable composition and a low one a thermally unstable composition. The sample of copolymer which served as a blank had a T-value of 4. The plasticized product had a T-value of 11, comparing favorably with the heat stabilized compositions of the same polymers heretofore known.

The invention is not limited to the use of the disclosed compound in the particular copolymer of the example, but is applicable generally to all polymeric vinylidene chloride compositions which tend to darken and decompose when heated, prolonging in each case the useful life of the polymer under exposure to heat.

I claim:

1. A composition of matter comprising a polymeric vinylidene chloride product which tends to decompose when heated, and, as a stabilizing plasticizer therefor, from 5 to 12 per cent by weight of α-methylbenzylbenzoate.

2. A composition of matter comprising a crystalline copolymer of vinylidene chloride and vinyl chloride, and, as a stabilizing plasticizer therefor, from 7 to 10 per cent by weight of α-methylbenzylbenzoate.

ARTHUR R. SEXTON.

No references cited.